(No Model.)
H. RICH.
ROTARY DRIER.
No. 522,767. Patented July 10, 1894.
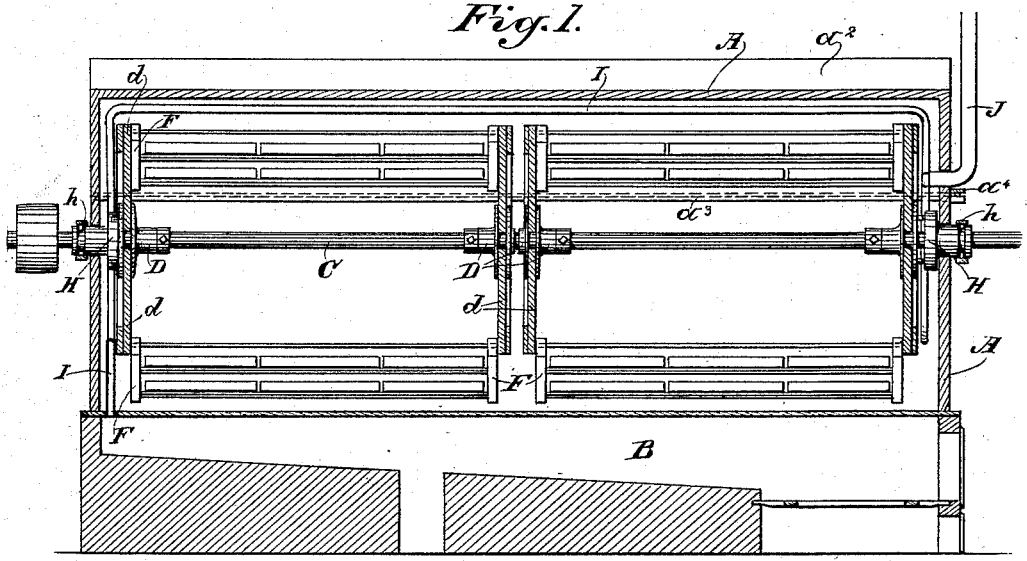
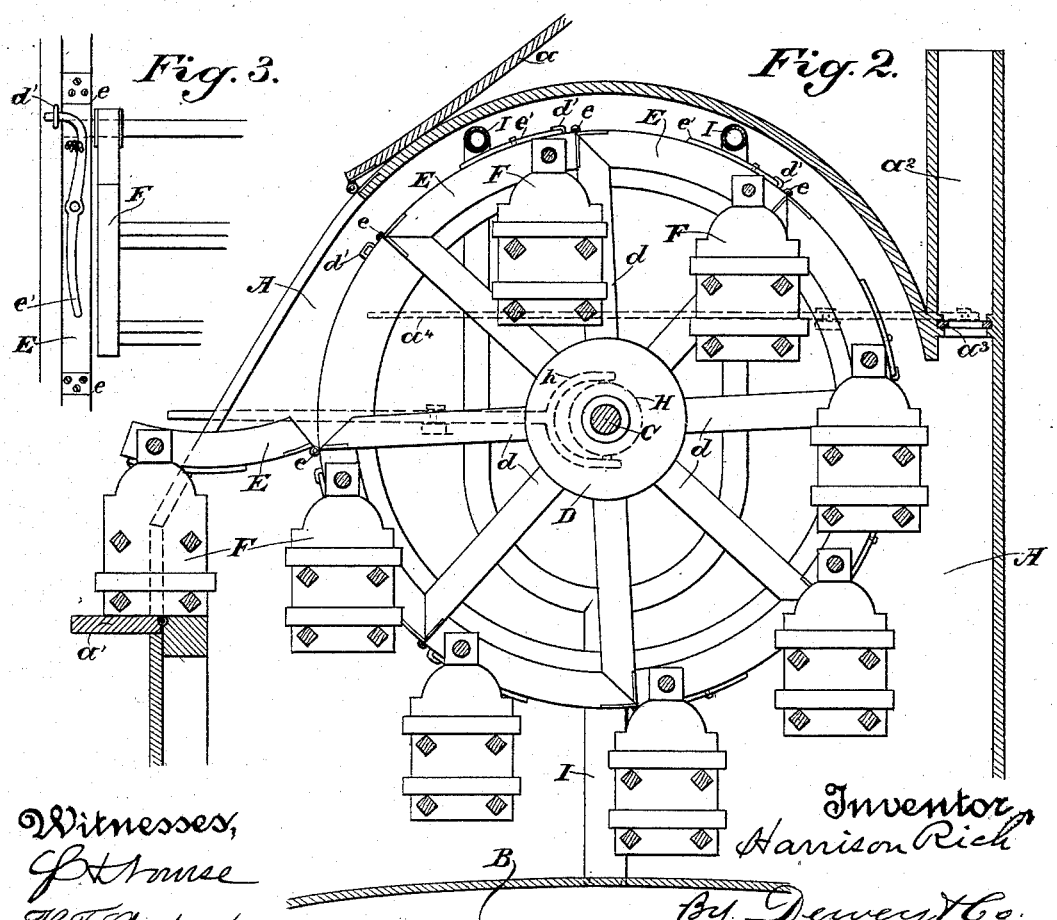
Witnesses,
Inventor,
Harrison Rich
By Dewey & Co.
Attys

UNITED STATES PATENT OFFICE.

HARRISON RICH, OF CORRALITOS, CALIFORNIA.

ROTARY DRIER.

SPECIFICATION forming part of Letters Patent No. 522,767, dated July 10, 1894.

Application filed December 4, 1893. Serial No. 492,757. (No model.)

*To all whom it may concern:*

Be it known that I, HARRISON RICH, a citizen of the United States, residing at Corralitos, county of Santa Cruz, State of California, have invented an Improvement in Rotary Driers; and I hereby declare the following to be a full, clear, and exact description of the same.

My invention relates to that class of driers in which the material carriers are freely suspended from a rotating reel mounted within a hot air casing.

My invention consists in the novel means of suspending and controlling the material carriers, whereby each may be readily swung outwardly beyond the periphery of the reel to reach a convenient and cool position in which they may be both loaded and unloaded, and whereby said carriers may be swung inwardly to the reel periphery and locked there when in normal operation.

It also consists in the novel construction of the encircling casing whereby the adjustable carriers may be readily manipulated; and finally it consists in making the reel in a plurality of independent sections, mounted upon a common shaft and adapted by means of suitable clutches to be engaged with and disengaged from the shaft, whereby any one section may be arrested and discharged and reloaded without stopping the operation of the other sections.

Referring to the accompanying drawings for a more complete explanation of my invention,—Figure 1 is a vertical longitudinal section of my drier. Fig. 2 is a vertical cross section of same. Fig. 3 is a detail of the catch mechanism.

A is a casing mounted upon an underlying furnace B of suitable construction. In this casing is mounted a shaft C, to which rotation is to be imparted in any suitable way. Upon this shaft is mounted a reel, composed of central hubs D, and radial arms $d$. To the outer ends of these arms are hinged at $e$, the drop flaps E from which are pivotally suspended the material carriers F, the latter being of any suitable character adapting them to carry the material to be dried or the trays in which said material is carried. These flaps are adapted to be swung upwardly to adjacent arms of the reels, and to be fastened rigidly by means of spring-controlled catches $e'$ adapted to engage staples $d'$ on the reel rim. In this normal and locked position, the carriers F lie well within the reel and remain so until the operation of drying is completed. Then by unlatching the catches $e'$, the flaps E may be swung outwardly and downwardly into line with arms $d$ to which they are hinged, and in this position, the carriers will be moved outwardly from the reel to a position in which they may be relieved of their loads and be reloaded once more. The advantage of this change of position of the carriers is a decided one in practical operation.

The heat within the casing is too great for comfort, and it is not a wise thing to permit an exposure to it in close proximity. To handle the material while in the reel is, therefore, not advisable. But by providing for projecting the carriers outwardly when it is required to relive and reload them, they can be worked with in safety and comfort.

To enable the carriers to be reached and handled conveniently I provide an upwardly swinging door $a$ in one side of the casing, and a downwardly swinging narrow platform $a'$. These when closed complete the casing, but when opened, the former exposes the carrier and the latter serves as a convenient shelf or platform for supporting the carrier in whole or in part and for resting the trays on in discharging and reloading. At the other side of the casing is the heat escape flue $a^2$ controlled by a damper $a^3$ operated by a rod or lever $a^4$.

In practice I divide the reel into a plurality of sections, and to illustrate this I have herein shown two, though it is to be understood that I may have more. Each of these sections is mounted loosely upon the shaft C, and each is independent of the other. Sliding clutches H upon the shaft, serve to connect or disconnect each section with said shaft. The clutches are opened by levers $h$. By this construction, it is possible, by disconnecting one section from the shaft, to stop it and to handle the material, while the other section is continuing to rotate.

The means for heating and drying consist of the furnace B, which has sides and ends of brick and a top of metal. At the back end the furnace is connected with pipes I, which pass up beside the reel end, thence over its top and down beside the other end of the reel, where they join in a common smoke stack J, at a point just above the furnace door. Thus the reel is heated from all sides.

Having thus described my invention, what I claim as new, and desire to secure by Letters Patent, is—

1. In a drier, the combination of a heating casing, a reel mounted and adapted to rotate therein, swinging flaps hinged to the periphery of the reel and adapted to be swung up thereto, and to be extended outwardly therefrom, and carriers freely suspended from said flaps, substantially as herein described.

2. In a drier, the combination of a heating casing, a reel mounted and adapted to rotate therein, swinging flaps hinged to the periphery of the reel and adapted to be swung up thereto and to be extended outwardly therefrom, catches for securing and holding the flaps when swung up and carriers freely suspended from said flaps, substantially as herein described.

3. In a drier, the combination of a heating casing, a reel mounted and adapted to rotate therein and composed of hubs and radial arms, swinging flaps hinged to the extremities of the arms whereby they may be turned upwardly to the general periphery of the reel and moved downwardly to project outwardly therefrom, the catches on the flaps engaging devices on the reel to hold said flaps when turned upwardly, and carriers freely suspended from the flaps, substantially as herein described.

4. In a drier, the rotating reel having the swinging flaps on its periphery and carriers freely suspended from said flaps, in combination with the heating casing over the reel and having the upwardly swinging access door in one side and the downwardly swinging platform forming a shelf or support, substantially as herein described.

5. In a drier, the rotating reel having the swinging flaps on its periphery and carriers freely suspended from said flaps, in combination with the heating casing over the reel and having the upwardly swinging access door in one side and the downwardly swinging platform forming a shelf or support, and a damper controlled exit flue at the other side, substantially as herein described.

6. In a drier, a rotating reel from which the material carriers are freely suspended, said reel being made in a plurality of independent sections a shaft extending freely or loosely through all of the sections, and means for rotating the said independent sections simultaneously or separately whereby one section can be stopped and its material handled without arresting the operation of the remaining sections, substantially as herein described.

7. In a drier, a rotating reel from which the material carriers are freely suspended, said reel being made in a plurality of independent sections, a rotating shaft common to all the sections, and upon which they are loosely mounted and suitable devices for connecting and disconnecting each section independently with said shaft, substantially as herein described.

8. In a drier, the combination of the furnace with its metallic top, the casing above, the drying reel within the casing and the heating pipes connected with the back of the furnace and passing beside both ends and top of the reel whereby said reel is heated from all sides, substantially as herein described.

In witness whereof I have hereunto set my hand.

HARRISON RICH.

Witnesses:
L. D. HOLBROOK,
DAVID F. MAHER.